(12) United States Patent
Dautz et al.

(10) Patent No.: US 12,455,038 B2
(45) Date of Patent: Oct. 28, 2025

(54) HEIGHT-ADJUSTING APPARATUS FOR A MOBILE FOUNDATION, AND MOBILE-FOUNDATION APPARATUS

(71) Applicant: Deutsche Post AG, Bonn (DE)

(72) Inventors: Christoph Dautz, Bonn (DE); Ulf Nägel, Weilerswist (DE); Jürgen Schüller, Aachen (DE)

(73) Assignee: Deutsche Post AG, Bonn (DE)

( * ) Notice: Subject to any disclaimer, the term of this patent is extended or adjusted under 35 U.S.C. 154(b) by 133 days.

(21) Appl. No.: 18/182,048

(22) Filed: Mar. 10, 2023

(65) Prior Publication Data

US 2023/0288016 A1 Sep. 14, 2023

(30) Foreign Application Priority Data

Mar. 14, 2022 (DE) ...................... 10 2022 105 823.9

(51) Int. Cl.
*F16M 11/24* (2006.01)
*F16H 25/20* (2006.01)

(52) U.S. Cl.
CPC ............. *F16M 11/24* (2013.01); *F16H 25/20* (2013.01); *F16M 2200/08* (2013.01)

(58) Field of Classification Search
CPC .... F16M 11/24; F16M 2200/08; F16H 25/20; E02D 27/32; E02D 27/42; E02D 35/005; E02D 27/00; A47G 29/12; A47G 29/1201; A47G 29/14; A47G 29/141; A47B 91/005; A47B 81/00; A47B 91/02
USPC ............ 248/188, 188.1, 188.3, 188.2, 188.4, 248/188.5, 188.8, 188.9, 91, 688, 346.05, 248/346.6, 649, 650, 677, 678; 108/147.19, 158.11
See application file for complete search history.

(56) References Cited

U.S. PATENT DOCUMENTS 2,101,852 A * 12/1937 Hammer .................. A47K 1/02
                                                                                                                                248/188.4
2,942,829 A * 6/1960 Stiffel ..................... F21V 21/10
                                                                                                                                248/200.1
5,819,482 A 10/1998 Belke et al.
(Continued)

FOREIGN PATENT DOCUMENTS

DE           20200259 U1    4/2002
GB            2436339 A     9/2007
(Continued)

OTHER PUBLICATIONS

German Office Action for corresponding German Application No. 102022105823.9, dated Dec. 23, 2022, 6 pages.
(Continued)

*Primary Examiner* — Kimberly T Wood
(74) *Attorney, Agent, or Firm* — Dority & Manning, P.A.

(57) ABSTRACT

A height-adjusting apparatus for a mobile foundation includes a rod with a threaded portion and a threaded plate, which is retained in an adjustable manner on the threaded portion and has a supporting surface. The height-adjusting apparatus also includes a tube, which has a cavity. The tube comprises at least one wall aperture on an outer side, as a result of which the rod projects into the cavity. Additionally, the height-adjusting apparatus is configured such that the rod can be rotated relative to the tube at least in part about an axis parallel to the longitudinal axis of the tube.

14 Claims, 2 Drawing Sheets

(56) References Cited

U.S. PATENT DOCUMENTS

| | | | | |
|---|---|---|---|---|
| 6,138,979 | A | * 10/2000 | Morman | A47B 91/00 248/188.4 |
| 7,252,276 | B2 | * 8/2007 | Acketts | G07F 19/20 248/346.02 |
| 2002/0084389 | A1 | * 7/2002 | Larson | A47B 21/00 248/371 |
| 2003/0033760 | A1 | 2/2003 | Rogers et al. | |
| 2012/0085873 | A1 | * 4/2012 | Brooke | A47B 91/16 248/188.3 |

FOREIGN PATENT DOCUMENTS

| | | | | |
|---|---|---|---|---|
| JP | S60102107 U | * | 7/1985 | |
| JP | 2006241929 A | | 9/2006 | |
| KR | 2019137526 A | * | 12/2019 | A47B 9/14 |
| WO | WO9324920 A | | 12/1993 | |
| WO | WO2007/088376 A1 | | 8/2007 | |
| WO | WO-2011047401 A2 | * | 4/2011 | E02D 27/016 |

OTHER PUBLICATIONS

Extended European Search Report (w/ English translation) for corresponding Application No. 23161452.0, dated Aug. 7, 2023, 16 pages.

* cited by examiner

HEIGHT-ADJUSTING APPARATUS FOR A MOBILE FOUNDATION, AND MOBILE-FOUNDATION APPARATUS

CROSS-REFERENCE TO RELATED APPLICATIONS

The present application is based upon and claims the right of priority to German Patent Application Number 10 2022 105 823.9, filed Mar. 14, 2022, the disclosure of which is hereby incorporated by reference herein in its entirety for all purposes.

TECHNICAL FIELD

The invention relates to a height-adjusting apparatus for a mobile foundation, in particular for a concrete base.

The invention additionally relates to a mobile-foundation apparatus comprising a mobile foundation and the aforementioned height-adjusting apparatus.

The invention further relates to a system comprising the aforementioned mobile-foundation apparatus and also comprising a parcel locker.

BACKGROUND OF THE INVENTION

When apparatuses such as containers, billboard supports or parcel lockers are set up outdoors, it is necessary for these to be protected against theft and/or against being blown over by the wind. This can be achieved, for example, via suitable anchoring means in the underlying surface. In particular when the apparatuses are merely to be set up on a temporary basis, and/or when the underlying surface does not allow the apparatus to be anchored directly therein, it has proven successful to use mobile foundations to secure the apparatus and/or to provide a planar underlying surface on which the apparatus can be set up. Mobile foundations are used, inter alia, as foundations for billboard supports, as a base for advertising columns and/or as an underlying surface for parcel lockers.

It is often the case that the mobile foundations are configured in the form of concrete blocks and/or concrete bases, but—depending on the use—they can also be manufactured from other suitable materials.

The disadvantage with known mobile foundations is that they do not allow any level-compensating measures for an uneven and/or sloping underlying surface. Accordingly, in the event of an underlying surface being uneven and/or sloping, this underlying surface has to be leveled out, prior to the mobile foundation being set up, which is a laborious task and involves additional costs. In addition, it is usually the case that it is no longer possible for an uneven and/or sloping underlying surface to be compensated for once the mobile foundation has been set up or even once the apparatus, for example the parcel locker, has been placed in position on the mobile foundation. In other words, known mobile foundations do not allow any retrospective compensation for unevennesses in, and/or inclination of, the underlying surface and are therefore of limited use.

DESCRIPTION OF THE INVENTION

Taking this situation as a departure point, it is the object of the present invention to provide measures which make it easier for mobile foundations to be set up on uneven and/or sloping underlying surfaces. In particular, the intention is to provide measures which make it possible to compensate for uneven and/or sloping underlying surfaces once the mobile foundation has been set up and/or once an apparatus such as a parcel locker has been placed in position on the mobile foundation.

The object of the invention is achieved by the features of the independent claims. Advantageous configurations are given in the dependent claims.

Accordingly, the object is achieved by a height-adjusting apparatus for a mobile foundation, comprising
  a rod with a threaded portion,
  a threaded plate, which is retained in an adjustable manner on the threaded portion and has a supporting surface, and
  a tube, which has a cavity,
wherein the tube comprises at least one wall aperture on an outer side, as a result of which the rod projects into the cavity, and wherein the height-adjusting apparatus is configured such that the rod can be rotated relative to the tube at least in part about an axis parallel to the longitudinal axis of the tube.

The object is further achieved by a mobile-foundation apparatus comprising a mobile foundation and the aforementioned height-adjusting apparatus, wherein the mobile foundation comprises an upper side with a bearing surface and comprises an underside at the bottom, which is located opposite the upper side, and also comprises at least one opening, which runs perpendicularly in relation to the bearing surface and is continuous all the way to the underside, wherein the rod projects into the opening of the mobile foundation by way of an end which is directed away from the tube, and the supporting surface of the threaded plate is arranged on the underside of the mobile foundation.

The object is additionally achieved by a system comprising a parcel locker and the aforementioned mobile-foundation apparatus.

One aspect of the invention is that the height-adjusting apparatus makes it possible, using straightforward means, to adjust a mobile foundation in terms of height. In order for the height-adjusting apparatus to be connected to the mobile foundation, the height-adjusting apparatus has the rod and the threaded plate. The height of the threaded plate, and therefore also the height of the supporting surface, can be adjusted via the threaded portion on the rod. Since, in the case of the mobile-foundation apparatus, the supporting surface of the threaded plate is arranged on the underside of the mobile foundation, it is thus possible to change the height of the mobile foundation in relation to the underlying surface by changing the position of the threaded plate on the threaded portion. The weight of the mobile foundation is preferably transferred from the threaded plate, via the rod, to the tube and therefore to the underlying surface. In this respect, provision is preferably made for that end of the rod which projects into the interior of the tube to rest on an inner side of the tube that is located opposite the aperture.

A further aspect of the invention is that the height-adjusting apparatus makes it possible for the mobile foundation to be set up on a sloping and/or uneven underlying surface and/or makes it possible to compensate for the sloping and/or uneven underlying surface. For this purpose, the height-adjusting apparatus has the tube, which functions as a standing rail and/or standing foot, and it is configured such that the rod can be rotated relative to the tube at least in part about the axis parallel to the longitudinal axis of the tube. The fact that the rod can be rotated relative to the tube also means, in other words, that the rod and the tube are not connected to one another in a rotationally fixed manner; rather, the rod can be moved, and in particular rotated, in relation to the tube and/or the tube can be moved, and in particular rotated, in relation to the rod. The tube provides the cavity into which one end of the rod projects. For this purpose, the tube has the wall aperture on its outer side, as a result of which the rod projects into the cavity of the tube. Wall aperture here is intended to mean an aperture in a side wall of the tube and not one of two openings which may be present on the end sides of the tube. In other words, the aperture is therefore located in a lateral surface of the tube. To take this point further, the rod therefore projects laterally into the tube. Since the wall aperture is in the lateral surface of the tube, and one end of the rod projects into the cavity of the tube, a longitudinal axis of the rod is not parallel to the longitudinal axis of the tube. In addition, it is therefore the case that the axis, parallel to the longitudinal axis of the tube, about which the rod can be rotated at least in part relative to the tube is also not parallel to the longitudinal axis of the rod. In other words, the at least partial rotation of the rod is therefore not a rotation of the rod about its longitudinal axis.

The wall aperture of the tube, as a result of which the rod projects into the cavity, particularly preferably gives the rod an amount of play such that the rod can be moved relative to the tube at least by way of the rotary movement. The axis of rotation of this rotary movement is preferably located directly in the wall aperture of the tube and runs parallel to the longitudinal axis of the tube. The tube and rod are connected, in particular, such that the rod can be rotated relative to the tube at least in part about the axis of rotation. "Can be rotated at least in part" particularly preferably means that a rotary movement of the rod about the axis of rotation is possible relative to the tube, wherein the rotary movement need not be a rotary movement by the full 360 degrees. The size of the rotary movement preferably depends on the geometry of the cavity of the tube. For example, the tube and rod can be connected such that the rod can be rotated relative to the tube by 2 degrees.

In other words, it is thus possible for the rod to rest in a sloping state within the cavity of the tube in relation to a plane of the underlying surface on which the tube is resting as a standing rail and/or standing foot. In this way, the apparatus makes it possible to compensate for an inclination of the underlying surface. For example, it is possible in this way that, in the case of an inclined underlying surface on which the tube is resting, the rod is oriented perpendicularly in relation to the underlying surface and, correspondingly, rests in a sloping state in the cavity in relation to the plane of the underlying surface.

In a further preferred development of the invention, provision is preferably made for the tube and rod to be connected such that the rod can be rotated by 360 degrees about a further axis of rotation relative to the tube, wherein the further axis of rotation runs through the wall aperture of the tube and is parallel to a normal vector of the plane of the underlying surface. Provision is preferably made, in other words, for the rod and the tube essentially to perform the function of a ball joint, as a result of which the height-adjusting apparatus and the mobile-foundation apparatus can readily be set up on a sloping and/or uneven underlying surface and the inclination of the underlying surface can be compensated for.

Provision is preferably made for the threaded portion of the rod to be an externally threaded portion. The external thread is further preferably configured to correspond to an internal thread of the threaded plate. In respect of the rod, in addition, provision can be made for the threaded portion to extend merely over a small region of the rod. However, provision is preferably made for the threaded portion to extend over more than a third of the length of the rod and further preferably over more than half the length of the rod. The rod is particularly preferably a threaded rod—that is to say a rod which has a thread essentially over its entire length. This also makes it possible to change the height of the mobile foundation by a large amount.

In respect of the tube, provision is made, according to a further preferred development of the invention, for the tube to comprise two mutually parallel and preferably planar outer sides and/or for the tube to be configured in the form of a rectangular tube. Accordingly, the tube can easily take over the function of the standing rail and/or of the standing foot of the height-adjusting apparatus. The weight of the mobile foundation is preferably transferred from the threaded plate, via the rod, to the tube and, in particular, to the planar inner side of the tube that is located opposite the wall aperture. The cross section of the tube is therefore particularly preferably rectangular and/or square. The tube is further preferably configured in the form of a metal tube.

According to a further preferred development of the invention, provision is made so that, at an end which is directed away from the tube, the rod comprises a torque-transmission device. Preferably this is a torque-transmission device based on a form fit. For example, the rod can have a screw head at its end. The end of the rod preferably has a slot, or a hole with an n-sided socket (for example hexagon socket), a triple-square socket and/or a hexalobular socket. The extent of the torque-transmission device is preferably no greater than the diameter of the rod. The rod is further preferably a threaded pin. In this way, the torque-transmission device easily makes it possible for the threaded plate to be positioned by the rod being rotated in relation to the rotationally fixed threaded plate. Rotation of the threaded plate about the rotationally fixed rod can therefore preferably be dispensed with for the purpose of adjusting the height of the mobile foundation.

According to a further preferred development of the invention, provision is made so that the height-adjusting apparatus comprises a plurality of rods, and so that, on the outer side, the tube comprises a plurality of wall apertures corresponding to the number of rods, as a result of which the rods project into the cavity. It is therefore particularly preferably the case that the height-adjusting apparatus does not just have one rod and one threaded plate; rather, it has a plurality of rods and a threaded plate for each rod. The tube preferably has a corresponding number of wall apertures, so that a respective rod projects through a wall aperture into the cavity of the tube. The height-adjusting apparatus particularly preferably comprises two rods and two threaded plates and a tube with two wall apertures. Provision can further preferably be made for the height-adjusting apparatus to comprise a plurality of rods and a plurality of tubes, and for the total number of wall apertures for the plurality of tubes to correspond to the number of rods.

The plurality of rods, and particularly preferably two rods in a single tube, particularly easily makes it possible to use the height-adjusting apparatus to compensate for a gradient of the underlying surface such that the mobile foundation has a bearing surface of which the normal vector is oriented in the vertical direction. In particular, gradient compensation is possible in all directions in the plane of the underlying surface—in other words, the tube need not be arranged in a specific direction in relation to the gradient.

As already mentioned, the invention also relates to the mobile-foundation apparatus comprising the mobile foundation and the aforementioned height-adjusting apparatus.

The object is therefore also achieved by the mobile-foundation apparatus comprising the mobile foundation and the height-adjusting apparatus, wherein the mobile foundation comprises the upper side with the bearing surface and comprises the bottom underside, which is located opposite the upper side, and also comprises at least one opening, which runs perpendicularly in relation to the bearing surface and is continuous all the way to the underside, wherein the height-adjusting apparatus comprises the rod with the threaded portion, the threaded plate, which is retained in an adjustable manner on the threaded portion and has the supporting surface, and the tube, which has the cavity, wherein the tube comprises at least the one wall aperture on the outer side, as a result of which the rod projects into the cavity, wherein the rod projects into the opening of the mobile foundation by way of the end which is directed away from the tube, and the supporting surface of the threaded plate is arranged on the underside of the mobile foundation, and wherein the height-adjusting apparatus is configured such that the rod can be rotated relative to the tube at least in part about the axis parallel to the longitudinal axis of the tube.

The mobile-foundation apparatus has the advantage that it can easily be adjusted in height once it has been set up on an underlying surface. In particular, there is no need for the tube, which functions as a standing rail and/or standing foot, to be rotated, as is customarily the case, for example, for the feet of furniture. Instead, the height of the mobile foundation can be adjusted by rotation of the rod. The rotation of the rod particularly preferably results in a change in the position of the threaded plate, the underside of the mobile foundation being arranged on the supporting surface thereof, as a result of which it is also the case that the height of the mobile foundation changes in relation to the underlying surface. In addition, the mobile-foundation apparatus has the advantage that, when it is being set up on an underlying surface with a gradient, the bearing surface of the mobile foundation can be oriented such that the normal vector of the bearing surface is oriented in the vertical direction. In particular, gradient compensation is possible in all directions in the plane of the underlying surface.

In addition, the tube, and in particular the rectangular tube, which functions as a standing rail, has the advantage that, irrespective of the extent of the gradient compensation set, the contact surface area in the form of the bearing surface of the tube is always the same. Accordingly, the tube always ensures evenly distributed loads. In other words, the tube, and in particular the rectangular tube, which functions as a standing rail, rests flat on the underlying surface in each case, irrespective of the extent of the gradient of the underlying surface.

According to a further preferred development of the invention, provision is preferably made for the mobile-foundation apparatus to be configured such that the rod can be displaced relative to the mobile foundation along a direction perpendicular to the bearing surface, in particular by means of a rotary movement of the rod about an axial extent axis of the rod. In other words, it is therefore preferably the case that the continuous opening in the mobile foundation and the diameter of the rod are coordinated with one another such that the rod can be displaced in the continuous opening along the axial extent axis and this movement is guided by the opening.

In this context, according to a further preferred development of the invention, provision is made for the mobile foundation to comprise an aperture in order for the threaded plate to be mounted in a rotationally fixed manner on the underside. The threaded plate is particularly preferably prevented from rotating relative to the mobile foundation by a form fit with the aperture. Accordingly, rotation of the rod about the axial extent axis of the rod results in a change in the position of the threaded plate on the rod, as a result of which the height of the supporting surface is changed. Correspondingly, the position of the rod in relation to the mobile foundation also shifts. Furthermore, provision is preferably made for the mobile-foundation opening, which runs perpendicularly in relation to the bearing surface and is continuous all the way to the underside, to be arranged in the aperture.

According to a further preferred development of the invention, provision is made for the mobile foundation to comprise a further aperture in order for the tube to be incorporated in a recessed state on the underside of the mobile foundation. The further aperture has the advantage that the entire tube, which functions as a standing rail and/or standing foot, can preferably be accommodated in the further aperture, so that, in a state in which the tube disappears within the further aperture, a significant proportion of the weight of the mobile foundation is transferred, via the bottom underside of the mobile foundation, to the underlying surface. It is only when the height of the mobile foundation is adjusted upward from this position, preferably by rotation of the rod causing the position of the threaded plate to be changed, that the underside of the mobile foundation, the underside being arranged on the supporting surface, is pushed upward and the weight of the mobile foundation is transferred, via the threaded plate and the rod, to the tube.

According to a further preferred development of the invention, in this context, provision is preferably made for the further aperture to correspond in length to a length of the tube and/or to extend over the entire underside of the mobile foundation. This makes it particularly easy to incorporate the tube in a recessed state in the further aperture of the mobile foundation.

In addition, in this context, provision is further preferably made for a width of the further aperture to correspond at least to a width of the tube. The width of the aperture is particularly preferably greater than the width of the tube and corresponds at least to the length of a rectilinear section which connects two tube sides, wherein, in a state in which the tube has been deflected to a maximum extent about the axis parallel to the longitudinal axis of the tube, said section is perpendicular to the rod and connects the two tube sides by a shortest distance.

Provision is therefore preferably made for the mobile foundation to comprise the aperture in order for the threaded plate to be mounted in a rotationally fixed manner on the underside of the mobile foundation and to comprise the further aperture in order for the tube to be incorporated in a recessed state on the underside of the mobile foundation. According to a further preferred development, in this context, provision is made for the aperture to be configured in the form of a depression in the further aperture. It is preferably the case that, at the location of the depression, an overall height of the further aperture and the depression corresponds at least to the sum of a height of the tube and a thickness of the threaded plate. The overall height is preferably measured from the lowermost point of the bottom underside of the mobile foundation. An overall height which preferably corresponds at least to the sum of the thickness of the threaded plate and the height of the tube has the advantage that the tube can readily be incorporated in a recessed state in the underside of the mobile foundation.

According to a further preferred development of the invention, provision is preferably made so that, on the upper side, the mobile foundation comprises a vertical extension, which extends along the bearing surface. The bearing surface is particularly preferably a plane surface, which allows a further apparatus such as a parcel locker to be arranged on the bearing surface. The vertical extension has the advantage that an apparatus arranged on the mobile foundation is supported laterally by the extension. The mobile foundation further preferably comprises, on the upper side, two vertical extensions, which extend on opposite sides of the bearing surface. These two extensions are particularly preferably of different heights. An extension which is configured to butt in part against a rear side of an apparatus which is to be arranged on the bearing surface is preferably higher than an extension which is configured to butt at least in part against a front side of the apparatus which is to be arranged on the bearing surface.

According to a further preferred development of the invention, provision is made for the continuous opening to run through the vertical extension. The continuous opening particularly preferably does not run through the bearing surface. Since the bearing surface serves as a surface on which to position the apparatus, the progression of the continuous opening through the vertical extension has the advantage that the height of the mobile foundation can be adjusted even after the apparatus has been set up on the bearing surface.

According to a further preferred development of the invention, provision is additionally made for the mobile foundation to comprise fastening means, which are preferably fitted on the bearing surface and/or on the vertical extension. The fastening means can easily be used to connect an apparatus such as a container, a parcel locker or the like to the mobile foundation and/or to fasten the same on the mobile foundation. The fastening means are preferably configured in the form of an internal thread. For example, in particular in the case of a mobile foundation manufactured from concrete, it is possible for threaded inserts to be cast into the mobile foundation.

The mobile foundation can be manufactured, in principle, from any desired material which is suitable for use outdoors. According to a further preferred development, the mobile foundation is configured in the form of a concrete base and/or concrete block. This is a cost-effective option of providing a robust and heavy mobile foundation.

According to a further preferred development of the invention, provision is made for the number of further apertures in order for the tube to be incorporated in a recessed state in the underside of the mobile foundation to correspond to the number of tubes, and/or for the number of apertures in order for the threaded plate to be mounted in a rotationally fixed manner to correspond to the number of threaded plates and/or rods. The mobile-foundation apparatus provided is particularly preferably one which comprises a mobile foundation and a height-adjusting apparatus, wherein the mobile foundation comprises the upper side with the bearing surface and comprises the bottom underside, which is located opposite the upper side, and also comprise two further apertures in order for the tube to be incorporated in a recessed state in the underside of the mobile foundation, and further comprises four openings, which run perpendicularly in relation to the bearing surface and are continuous all the way to the underside, wherein the height-adjusting apparatus comprises four rods with a respective threaded portion, four threaded plates, which are each retained in an adjustable manner on the threaded portion and have the supporting surface, and two tubes, which each have the cavity, wherein each tube comprises two wall apertures on the outer side, as a result of which a respective rod projects into the cavity, wherein each rod projects into an opening of the mobile foundation by way of the end which is directed away from the tube, the supporting surfaces of the threaded plates are arranged on the underside of the mobile foundation, and wherein the height-adjusting apparatus is configured such that each rod can be rotated, relative to the tube into the cavity of which the end of the rod projects, at least in part about an axis parallel to the longitudinal axis of that tube.

The mobile-foundation apparatus therefore preferably has two tubes, which function as standing rails and/or standing feet, wherein each tube comprises two respective wall apertures for two rods. This makes it possible, in a particularly easy and cost-effective way, to compensate for the inclination of the underlying surface and to change the height of the mobile foundation.

As already mentioned, the invention additionally relates to the system comprising the parcel locker and the mobile-foundation apparatus. The parcel locker is preferably arranged on the bearing surface of the mobile foundation. In addition, provision is preferably made for the vertical extension of the mobile foundation to be adjacent to a rear wall of the parcel locker. Accordingly, the vertical extension can further stabilize the parcel locker.

Provision is further preferably made, in addition, for the parcel locker to be fastened on the mobile foundation, particularly preferably by way of the fastening means, which are fitted on the mobile foundation. Provision is further preferably made for a bottom of the parcel locker to be connected to the bearing surface, and/or for the rear wall of the parcel locker to be connected to the vertical extension.

A person skilled in the art can gather further technical features and advantages of the system and of the mobile-foundation apparatus from the description of the height-adjusting apparatus.

BRIEF DESCRIPTION OF THE DRAWINGS

The invention will be explained in more detail hereinbelow with reference to the appended drawings and on the basis of a preferred exemplary embodiment.

In the drawings.

DETAILED DESCRIPTION OF THE EXEMPLARY EMBODIMENTS

The exemplary embodiments described are merely examples which can be modified and/or supplemented in a variety of different ways in line with the claims. Any feature which has been described for a specific exemplary embodiment can be utilized on its own or in combination with other features in any other desired exemplary embodiment. Any feature which has been described for an exemplary embodiment of a certain category can also be used correspondingly in an exemplary embodiment from some other category.

Figure 1:
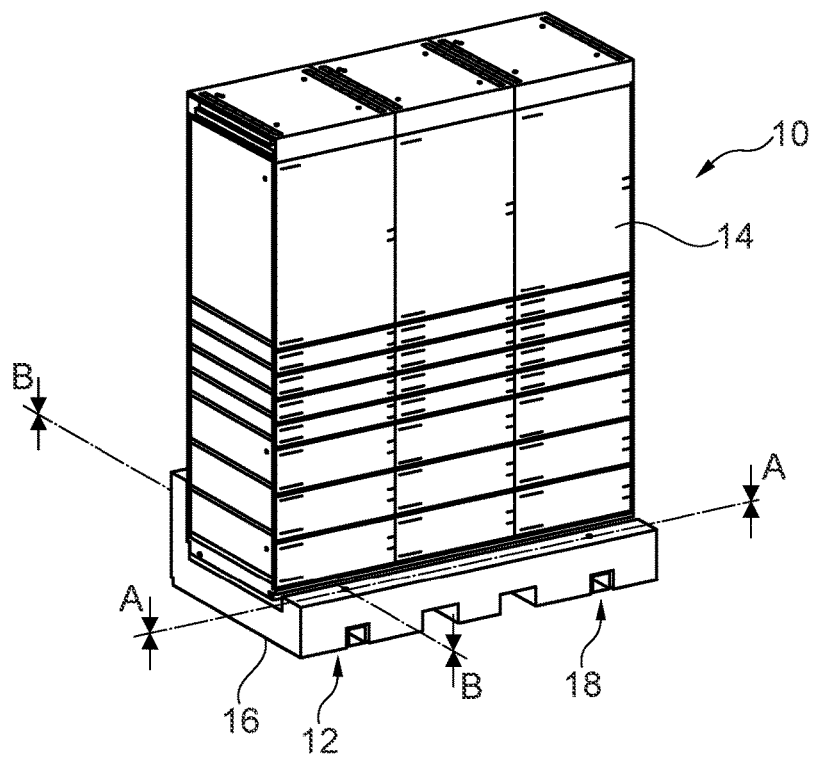
FIG. 1 shows a schematic illustration of a system comprising a mobile-foundation apparatus and a parcel locker, according to one preferred exemplary embodiment of the invention.

FIG. 1 shows a schematic illustration of a system 10 comprising a mobile-foundation apparatus 12 and a parcel locker 14. The mobile-foundation apparatus 12, for its part, comprises, in turn, a mobile foundation 16, which in this exemplary embodiment is configured in the form of a concrete base 16, and a height-adjusting apparatus 18, which will be explained in more detail hereinbelow and by means of which the mobile foundation 16 can be adjusted in terms of height.

Figure 2:
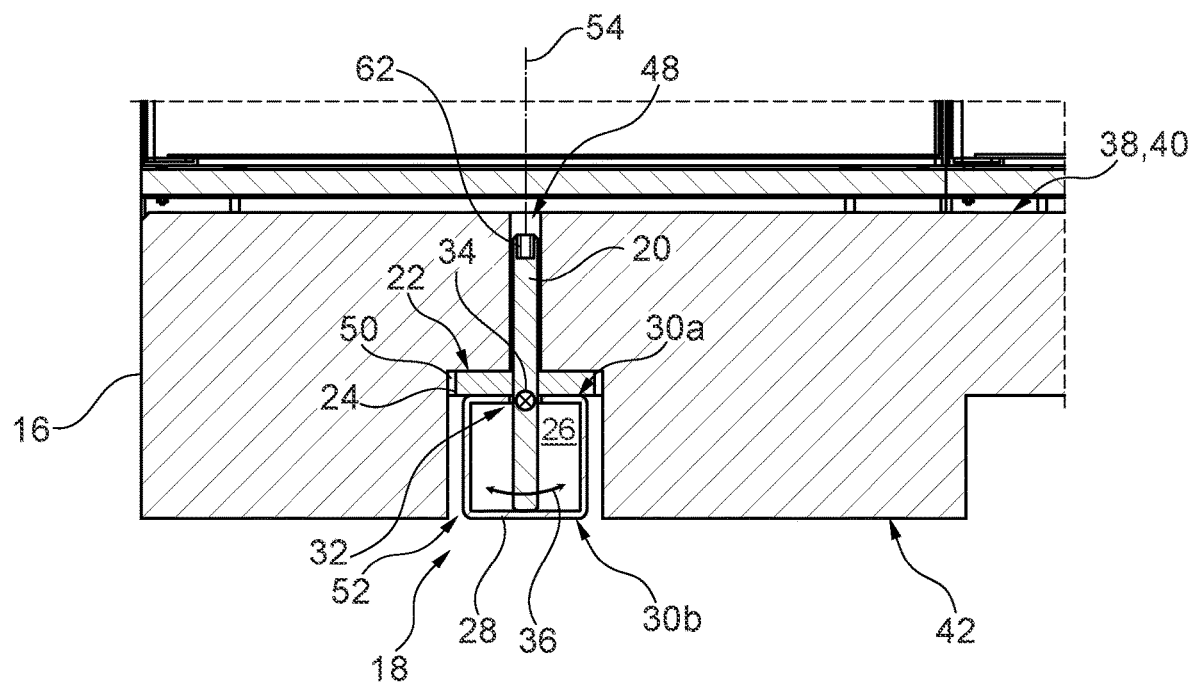
FIG. 2 shows a schematic sectional illustration of the system from FIG. 1 taken along line A-A.
Figure 3:
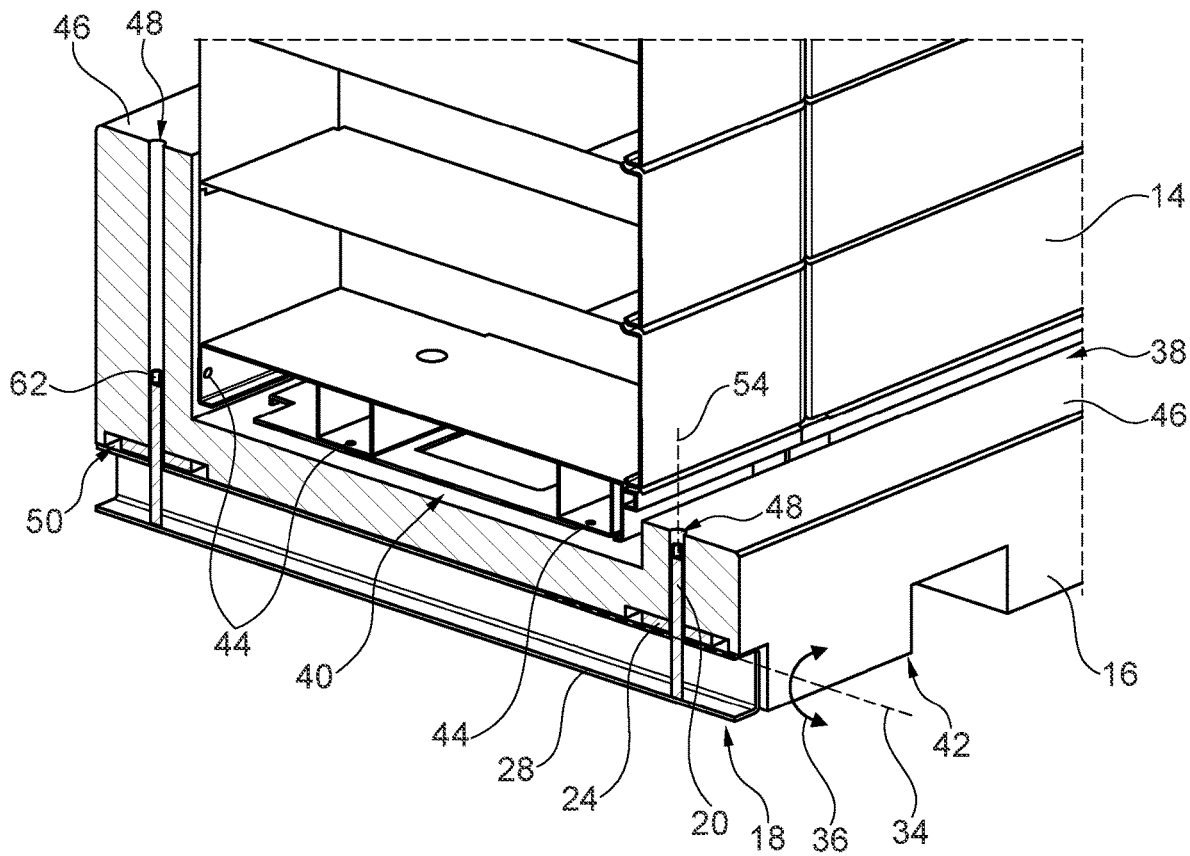
FIG. 3 shows a schematic sectional illustration of the system from FIG. 1 taken along the line B-B.

FIGS. 2 and 3 show sectional illustrations through the system 10 shown in FIG. 1, the sections being taken along the lines indicated by A and B in FIG. 1. It can be seen in FIGS. 2 and 3 that the height-adjusting apparatus 18 comprises a rod 20 with a threaded portion, which in the present exemplary embodiment extends over the entire length of the rod 20, a threaded plate 24, which is retained in an adjustable manner on the threaded portion and has a supporting surface 22, and a tube 28, which has a cavity 26. The tube 28 here is configured in the form of a rectangular tube 28 and has two mutually parallel outer sides 30a, 30b. On one of the outer sides 30a, the tube 28 comprises a wall aperture 32, through which the rod 20 projects into the cavity 26. The wall aperture 32 gives the rod 20 an amount of play, so that the rod 20 can be rotated relative to the tube 28 at least in part about an axis 34 parallel to the longitudinal axis of the tube 28. The axis of rotation 34 runs directly through the wall aperture 32 and, in FIG. 2, is located perpendicularly in relation to the drawing plane. Accordingly, the axis of rotation 34 in FIG. 2 is illustrated in the form of a circle with a cross in it. The rotary movement is indicated in FIGS. 2 and 3 by the arrow 36, wherein, in FIG. 2, the rod 20 performs a rotary movement in the drawing plane.

It can be seen in particular in FIG. 3 that the mobile foundation 16 additionally comprises an upper side 38 with a bearing surface 40 and comprises a bottom underside 42, which is located opposite the upper side 38. The parcel locker 14 is arranged on the bearing surface 40 and is connected, by means of threaded pins 44, to fastening means—in the present case threaded inserts with an internal thread—incorporated in the mobile foundation 16. The bearing surface 40 of the mobile foundation 16 is flanked on two sides by a vertical extension 46. The rear side of the parcel locker 14 is connected, by means of a further threaded pin 44, to the vertical extension 46, which butts against the rear side.

In order for the mobile foundation 16 to be connected to the height-adjusting apparatus 18, the mobile foundation 16 has openings 48, which run perpendicularly in relation to the bearing surface 40 and are continuous all the way to the underside 42. In the present case, the openings 48 run through the vertical extensions 46. As can be seen in particular in FIG. 2, the rod 20 of the height-adjusting apparatus 18 projects into the opening 48 of the mobile foundation 16 by way of an end which is directed away from the tube 28, wherein the supporting surface 22 of the threaded plate 24 is arranged on the underside 42 of the mobile foundation 16.

As can additionally be seen to good effect in FIGS. 2 and 3, the mobile foundation 16 has an aperture 50 in order for the threaded plate 24 to be mounted in a rotationally fixed manner on the underside 42, the aperture 50 establishing a form fit to prevent the threaded plate 24 from rotating relative to the mobile foundation 16. The mobile foundation 16 also has further apertures 52 in order for the tubes 28 to be incorporated in a recessed state on the underside 42 of the mobile foundation 16. As FIGS. 1 to 3 show, the further apertures 52 make it possible for the entire tube 28, which functions as a standing rail, to be accommodated in the further aperture 52, so that, in the state which is shown in FIGS. 1 to 3, a considerable proportion of the weight of the mobile foundation 16 is transferred, via the bottom underside 42, to the underlying surface. For this purpose, the further apertures 52 extend over the entire underside 42 of the mobile foundation 16. It is also the case that, in order for the threaded plate 24 to be mounted in a rotationally fixed manner, the apertures 50 are configured in the form of depressions in the further apertures 52. At the location of the depression, in addition, an overall height of the further aperture 52 and the depression 50 corresponds to the sum of a height of the tube 28 and a thickness of the threaded plate 24.

Figure 4:
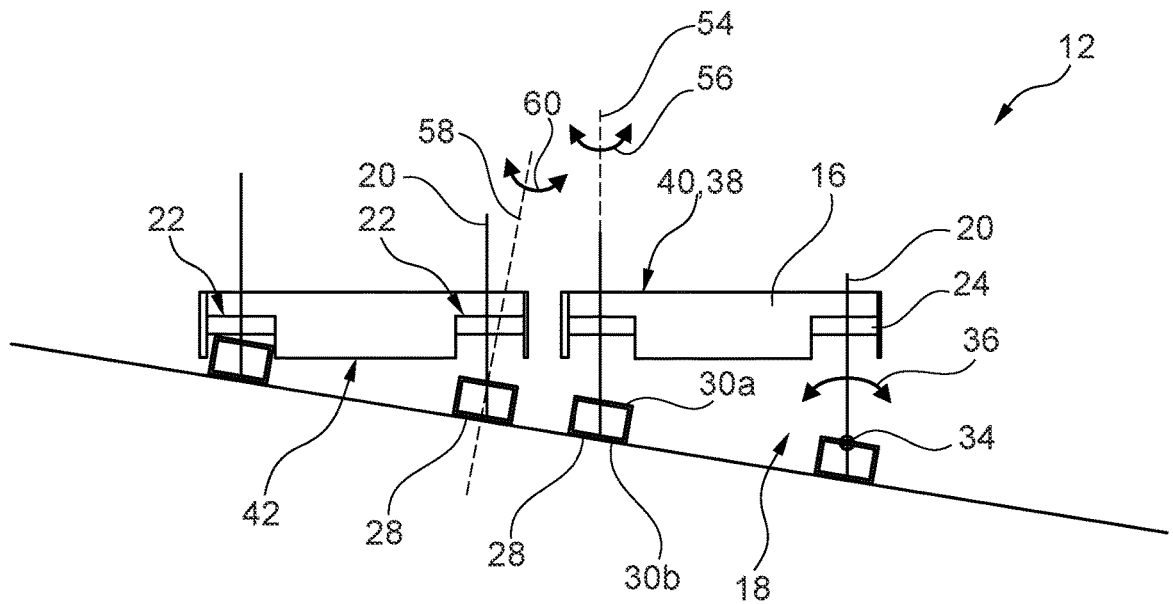
FIG. 4 shows a schematic illustration of a mobile-foundation apparatus, according to a further preferred exemplary embodiment of the invention.

FIG. 4 shows a further schematic illustration of a further preferred embodiment of the mobile-foundation apparatus 12 comprising the mobile foundation 16 and the height-adjusting apparatus 18. In the case of this embodiment, the mobile foundation 16 has no vertical extensions on the upper side 38. Instead, the entire upper side 38 is formed by the bearing surface 40. FIG. 4 clearly illustrates, in particular, the height-adjusting function and inclination-compensating function of the height-adjusting apparatus 18. The position of the threaded plate 24 can be changed by rotation of the rod 20 about an axial extent axis 54 of the rod 20, which is illustrated symbolically by the arrow 56 in FIG. 4, this resulting in a change in the position of the underside 42 of the mobile foundation 16, the underside being arranged on the supporting surface 22. In the case of an inclined underlying surface, as illustrated in FIG. 4, the bearing surface 40 of the mobile foundation 16 can be horizontally adjusted, and the difference in level compensated for, via the height-adjusting apparatus 18.

In particular, it can be seen in FIG. 4 that, in the case of an inclined underlying surface, the rod 20, in relation to the two mutually parallel outer sides 30a, 30b of the tube 28, rests in a sloping state in the cavity 26 of the tube 28.

In addition, it can be seen schematically in the exemplary embodiment which is shown in FIG. 4 that the connection between the tube 28 and rod 20 is such that the rod 20 can be rotated relative to the tube 28 by 360 degrees about a further axis of rotation 58, which is illustrated by the arrow 60. The further axis of rotation 58 here runs through the wall aperture 32 of the tube 28 and parallel to a normal vector of the plane of the underlying surface.

Coming back to the exemplary embodiment which is shown in FIGS. 1 to 3, it can additionally be seen, in particular in FIGS. 2 and 3, that, at the end which is directed away from the tube 28, the rod 20 comprises a torque-transmission device 62 based on a form fit—in the present case a hole with a hexagon socket.

LIST OF REFERENCE SIGNS

System 10
Mobile-foundation apparatus 12
Parcel locker 14
Mobile foundation, concrete base 16
Height-adjusting apparatus 18
Rod 20
Supporting surface 22
Threaded plate 24
Cavity 26
Tube, rectangular tube 28
Outer side 30

Wall aperture 32
Axis of rotation 34
Arrow, rotary movement 36
Upper side 38
Bearing surface 40
Underside 42
Threaded pin 44
Vertical extension 46
Opening 48
Aperture 50
Further aperture 52
Axial extent axis of the rod 54
Arrow, rotary movement 56
Further axis of rotation 58
Arrow, rotary movement 60
Torque-transmission device 62

The invention claimed is:

1. Mobile-foundation apparatus comprising a mobile foundation and a height-adjusting apparatus, comprising:
   wherein the height-adjusting apparatus comprises:
   a rod with a threaded portion,
   a threaded plate, which is retained in an adjustable manner on the threaded portion and has a supporting surface, and
   a tube, which has a cavity, a lateral surface, and a longitudinal axis,
   wherein the tube comprises at least one wall aperture in the lateral surface, wherein the rod projects through the wall aperture into the cavity, such that a longitudinal axis of the rod is not parallel to the longitudinal axis of the tube, and wherein the height-adjusting apparatus is configured such that the rod can be rotated relative to the tube at least in part about an axis parallel to the longitudinal axis of the tube,
   wherein the mobile foundation comprises an upper side with a bearing surface and comprises a bottom, underside, which is located opposite the upper side, and also comprises at least one opening, which runs perpendicularly in relation to the bearing surface and is continuous all the way to the underside, wherein the rod projects into the at least one opening of the mobile foundation by way of an end which is directed away from the tube, and the supporting surface of the threaded plate is arranged on the underside of the mobile foundation.

2. Mobile-foundation apparatus according to claim 1, wherein the tube comprises two mutually parallel and preferably planar outer sides and/or is configured in the form of a rectangular tube.

3. Mobile-foundation apparatus according to claim 1, wherein, at an end which is directed away from the tube, the rod comprises a torque-transmission device.

4. Mobile-foundation apparatus according to claim 1, wherein the height-adjusting apparatus comprises a plurality of rods, and wherein, on an outer side, the tube comprises a plurality of wall apertures corresponding to the plurality of rods, as a result of which the rods project into the cavity.

5. Mobile-foundation apparatus according to claim 1, wherein the mobile-foundation apparatus is configured such that the rod can be displaced relative to the mobile foundation along a direction perpendicular to the bearing surface, in particular by means of a rotary movement of the rod about an axial extent axis of the rod.

6. Mobile-foundation apparatus according to claim 1, wherein the mobile foundation comprises an aperture in order for the threaded plate to be mounted in a rotationally fixed manner on the underside.

7. Mobile-foundation apparatus according to claim 6, wherein the at least one opening, which runs perpendicularly in relation to the bearing surface and is continuous all the way to the underside is arranged in the aperture.

8. Mobile-foundation apparatus according to claim 1, wherein the mobile foundation comprises a further aperture in order for the tube to be incorporated in a recessed state on the underside of the mobile foundation.

9. Mobile-foundation apparatus according to claim 8, wherein the further aperture corresponds in length with a length of the tube and/or extends over the entire underside of the mobile foundation.

10. Mobile-foundation apparatus according to claim 6, wherein the aperture is configured in the form of a depression in a further aperture.

11. Mobile-foundation apparatus according to claim 1, wherein, on the upper side, the mobile foundation comprises a vertical extension, which extends along the bearing surface.

12. Mobile-foundation apparatus according to claim 11, wherein the continuous at least one opening runs through the vertical extension.

13. Mobile-foundation apparatus according to claim 1, wherein the mobile foundation comprises fastening means, which are preferably fitted on the bearing surface.

14. System comprising a mobile-foundation apparatus according to claim 1 and also comprising a parcel locker.

* * * * *